Nov. 2, 1926.
1,605,098
R. J. DEARBORN
MANUFACTURE OF ALUMINUM CHLORIDE
Filed Nov. 29, 1921
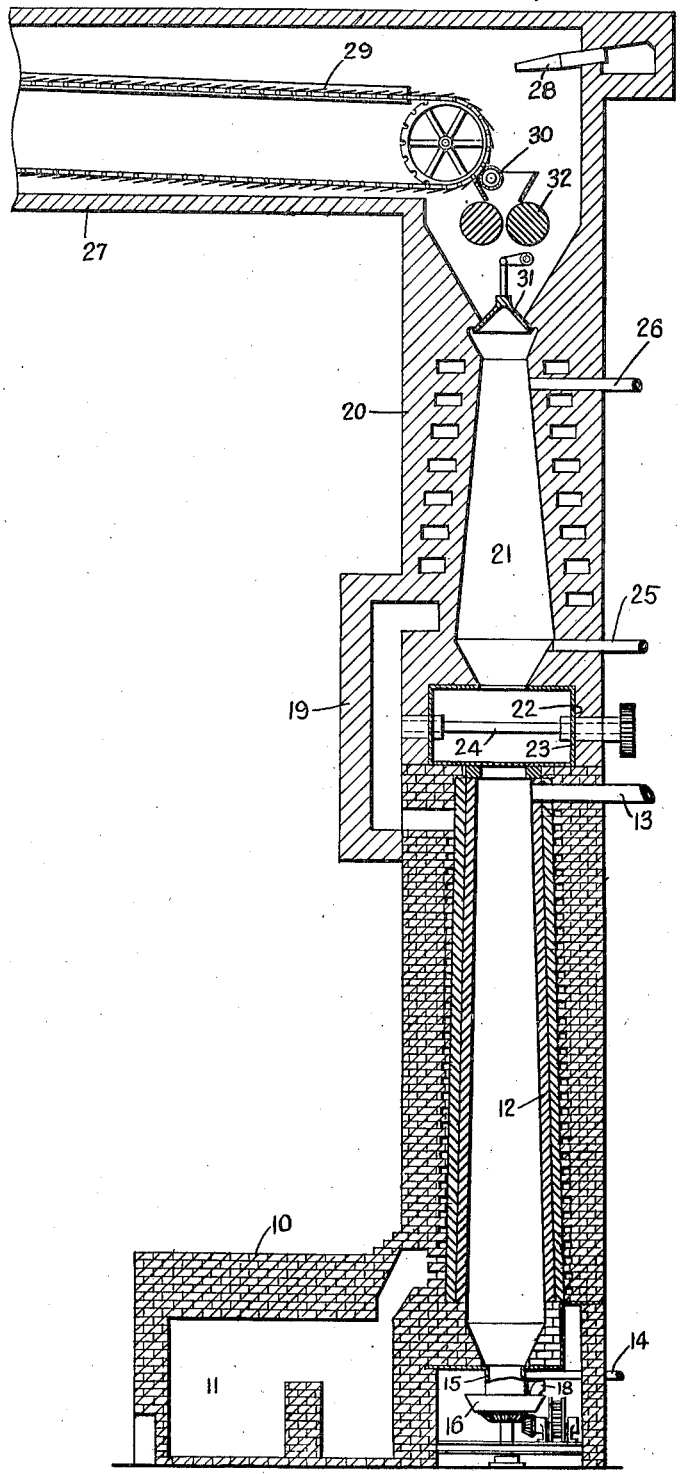
INVENTOR
R. J. Dearborn Patented Nov. 2, 1926.

1,605,098

UNITED STATES PATENT OFFICE.

RICHARD J. DEARBORN, OF SUMMIT, NEW JERSEY, ASSIGNOR TO THE TEXAS COMPANY, OF NEW YORK, N. Y., A CORPORATION OF TEXAS.

MANUFACTURE OF ALUMINUM CHLORIDE.

Application filed November 29, 1921. Serial No. 518,540.

This invention relates to the production of metal chlorides and has particular reference to the preparation of anhydrous aluminum chloride in relatively large quantities and of a high degree of purity.

The aluminum ores which are frequently used in the preparation of aluminum chloride commonly contain a greater or less amount of impurities, chief among which are iron compounds. If such ores be treated with chlorin under conditions to form aluminum chloride, the resultant product will contain chlorides of iron or of other metals which may be present in the aluminum ores.

In accordance with my invention the aluminum ore is treated to remove therefrom the iron and other impurities and the purified alumina is then chlorinated to produce an aluminum chloride uncontaminated with iron compounds.

The invention relates particularly to the production of the chloride in a continuous manner. In the large scale production of aluminum chloride, it is advantageous to maintain the reaction chamber in continuous operation for some time and in accordance with my invention the aluminum ore is simultaneously preheated and treated to remove impurities and the aluminum ore thus heated and purified is continuously charged into a chlorination retort wherein the ore is treated to produce aluminum chloride, the ash formed in the reaction being continuously removed from the retort and the chloride vapors condensed and collected.

One phase of the invention consists in carrying on the preheating and purifying of the ore by means of waste heat from the alumina chlorinating retort, thereby conducting the preliminary treatment of the ore with a minimum of expense. Another feature of the invention is the coking of the aluminum ore with carbonaceous material in the presence of a chlorinating agent so that impurities such as iron chloride may be removed from the ore during the coking step.

I will now proceed to describe the invention in detail, reference being had to the single figure of accompanying drawing which is a sectional elevation of apparatus constructed in accordance with the invention, and constituting an embodiment thereof.

In the apparatus thus illustrated a furnace 10 having a combustion chamber 11, is arranged to supply heat, preferably through checkered brick work, to a retort 12 which is constructed of suitable refractory material. The aluminum chloride vapors are removed by a vapor line 13 to suitable condensers or collecting vessels. Chlorin gas or other chlorinating agent is supplied to the retort by means of a pipe 14 which preferably enters near the bottom of the retort. As illustrated, the pipe communicates with an extension 15 formed at the bottom of the retort and which depends into a rotatable pan 16. A plough 18 is arranged to remove material in the pan to a predetermined depth so that a certain amount of material may remain in the pan to form a seal preventing either the ingress or egress of gases to or from the retort while at the same time allowing the excess ash to be discharged over the rim of the pan. This arrangement makes possible the continuous operation of the retort.

A flue 19 removes the spent combustion gases, which have been employed in heating the retort 12, and delivers these gases into a heating chamber 20 in which is mounted the purifying retort or chamber 21. The retort 21 is preferably superposed above the retort 12 in such manner that material may readily be transferred from the upper to the lower retort. In the arrangement illustrated the products discharged from the retort 21 enter the hopper 22 having a continuously operated gate 23 controlled by a shaft 24 which may be operated by any suitable mechanism. It is to be understood that any convenient arrangement for transferring materials from one retort to another may be used, but it is desirable to so design the apparatus as to reduce to a minimum the passage of gas from the alumina chlorinating retort into the purifying retort or vice versa. The retort 21 is equipped with a pipe 25 for introducing the chlorinating agent and a conduit 26 for removing the iron chloride vapors or other vaporous products resulting from the preliminary treatment of the aluminum ore.

An oven 27 supplied with heat by means of a burner or heat conduit 28 or by any other suitable means, is provided to preheat and coke the mixture of aluminum ore and reducing agent which it is desired to chlorinate. A conveyor 29 is adapted to continuously convey material to be coked through the oven 27. The resultant coke is removed from the conveyor by any suitable mechanism, such as a rotatable scraper 30, and then discharged through a hopper 31 into the retort 21. If desired, the coked product may be passed between rollers 32 for the purpose of crushing the coke into the size desired.

In using the apparatus illustrated an aluminum ore, such as bauxite, aulminum silicate, or other alumina containing clay, is mixed with carbonaceous material and then coked in the oven 27. The coked product is then charged into the retort 21 which is preferably heated by the waste gases, which have been used in heating the retort 12 and is therefore maintained at a lower temperature than that of the lower retort. Hydrochloric acid gas or chlorin, or other chlorinating agent, is introduced through the conduit 25. Iron oxid present in the aluminum ore is thus chlorinated and the resulting iron chloride passes through the vapor line 26. Other impurities in the aluminum ore which are more readily attacked by chlorin than alumina are also removed from the aluminum ore in the retort 21.

The aluminum ore thus purified is continuously charged into the retort 12 wherein it is subjected to the action of chlorin or other chlorinating agent under a much higher temperature than that obtaining in the preliminary retort. The temperature maintained is sufficient to cause the reaction between alumina and chlorin resulting in the production of aluminum chloride vapors which are removed through the vapor line 13.

In a modified form of the invention the retort 21 may be omitted and a chlorinating agent introduced directly into the coking oven 27, that is, the coking is carried on in an atmosphere of chlorin or hydrochloric acid gas or the like, so that the iron and other impurities may be attacked by the chlorinating agent and thus removed from the aluminum ores. The coked product is removed from the oven 27 before any substantial proportion of alumina is attacked and discharged into the retort 12. The aluminum ore is attacked by the chlorin in the retort 12 with the consequent formation of aluminum chloride.

Apparatus of preferred construction and arrangement and process steps which I now consider most desirable, have been shown and described herein, but I intend that only such limitations be imposed as are indicated in the appended claims.

What I claim is:

1. The process of making aluminum chloride which comprises admitting a mixture of aluminum ore and a reducing agent to an auxiliary retort, supplying a chlorinating agent to said retort while maintaining therein a temperature sufficient to chlorinate reactive iron compounds present in the ore but insufficient to chlorinate any substantial portion of the alumina, removing the generated vapors from said retort, continuously transferring the ore mixture thus purified without substantial loss of heat to a main retort, introducing a chlorinating agent into said main retort while maintaining therein a temperature sufficient for the formation of aluminum chloride, collecting the aluminum chloride and continuously removing from said main retort the residual ash.

2. Apparatus for the manufacture of aluminum chloride comprising a main retort, means for introducing a chlorinating agent into the said retort; an auxiliary retort positioned above said main retort; means for continuously transferring solid material directly from the auxiliary retort to the main retort without substantial loss of heat; means for introducing a chlorinating agent to the auxiliary retort, and means for introducing solid material to said retort.

3. Apparatus for the manufacture of aluminum chloride comprising a main retort; a furnace adapted to supply heat to said retort; means for introducing a chlorinating agent to said retort; an auxiliary retort positioned above the main retort and adapted to be heated by waste gases from the retort furnace; means for continuously transferring solid material directly from the auxiliary retort without any substantial loss of heat; means for introducing a chlorinating agent to the auxiliary retort; and means for introducing solid material thereto.

4. Apparatus for the manufacture of aluminum chloride, comprising a main retort; a furnace adapted to supply heat thereto; means for introducing a chlorinating agent thereto; means for continuously withdrawing the products of reaction from said retort; an auxiliary retort positioned above the main retort and adapted to be heated by waste gases from the main retort furnace; means for introducing chlorin to the auxiliary retort; a vapor line from said retort; a coking oven adapted for the preparation of an alumina-carbon coke and arranged to discharge said coke directly into the auxiliary retort without any substantial loss of heat.

In witness whereof, I have hereunto set my hand this 23rd day of November, 1921.

RICHARD J. DEARBORN.